(12) United States Patent
Wu et al.

(10) Patent No.: US 10,095,096 B2
(45) Date of Patent: Oct. 9, 2018

(54) PROJECTOR, LIGHT SOURCE CONTROLLER, AND LIGHT SOURCE CONTROL METHOD

(71) Applicant: Coretronic Corporation, Hsin-Chu (TW)

(72) Inventors: Jian-Jiun Wu, Hsin-Chu (TW); Liang-Chieh Weng, Hsin-Chu (TW); Mu-Ting Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/916,217

(22) Filed: Mar. 8, 2018

(65) Prior Publication Data

US 2018/0259838 A1    Sep. 13, 2018

(30) Foreign Application Priority Data

Mar. 10, 2017  (CN) .......................... 2017 1 0140340

(51) Int. Cl.
*G03B 21/14*        (2006.01)
*G03B 21/20*        (2006.01)

(52) U.S. Cl.
CPC ....... *G03B 21/2053* (2013.01); *G03B 21/204* (2013.01)

(58) Field of Classification Search
CPC .............. G05B 21/2053; G05B 21/204; G05B 21/142; G05B 21/2013
See application file for complete search history.

(56) References Cited

U.S. PATENT DOCUMENTS

| 2002/0180869 A1 | 12/2002 | Callison et al. | |
| 2006/0215122 A1* | 9/2006 | Hong | H04N 9/3111 |
| | | | 353/31 |
| 2009/0284148 A1* | 11/2009 | Iwanaga | G02B 26/008 |
| | | | 313/506 |
| 2010/0097779 A1* | 4/2010 | Gladnick | G01J 3/10 |
| | | | 362/84 |
| 2010/0245777 A1* | 9/2010 | Ogura | G02B 5/0215 |
| | | | 353/38 |
| 2010/0328625 A1* | 12/2010 | Miyazaki | G02B 26/008 |
| | | | 353/85 |
| 2012/0019785 A1* | 1/2012 | Tseng | G03B 21/2013 |
| | | | 353/31 |

\* cited by examiner

*Primary Examiner* — Dedei K Hammond
*Assistant Examiner* — Raymond R Chai
(74) *Attorney, Agent, or Firm* — JCIPRNET (57) ABSTRACT

A projector, a light source controller, and a light source control method are provided. The projector includes a light source, a wavelength conversion device, and a light source controller. The light source is adapted to provide a light beam. The wavelength conversion device is adapted to convert a wavelength of the light beam into a plurality of converted wavelengths. The light source controller includes a controller and a selector. The controller is adapted to receive a synchronization signal, and generate an enable signal and a plurality of indication signals according to the synchronization signal. The enable signal has a plurality of pulses, and there is an interval time between adjacent two pulses. The selector is adapted to select one of the control voltages according to the enable signal and the indication signals to generate a light source control signal.

36 Claims, 8 Drawing Sheets

PROJECTOR, LIGHT SOURCE CONTROLLER, AND LIGHT SOURCE CONTROL METHOD

CROSS-REFERENCE TO RELATED APPLICATION

This application claims the priority benefit of China application serial no. 201710140340.8, filed on Mar. 10, 2017. The entirety of the above-mentioned patent application is hereby incorporated by reference herein and made a part of this specification.

BACKGROUND OF THE INVENTION

Field of the Invention

The invention relates to a projector, a light source controller, and a light source control method, and particularly relates to a projector, a light source controller, and a light source control method adapted to expand light sources.

Description of Related Art

Along with popularization of electronic products, projector has a wider range of applications, and becomes a useful tool in people's daily life. In the projectors of the well-known technical field, to use laser to produce a projection light source has become a development trend.

In the well-known technical field, most of the projectors of the laser light source take a single color light (a blue light) laser as the projection light source, and produce one or a plurality of other color lights through a phosphor wheel. Moreover, the projector of the well-know technical field is configured with a control chip to provide limited control signals, and projects the aforementioned different color lights in different time intervals according to the control signals.

In the projector of the well-know technical field, the control signals provided by the control chip are only enough to control a single laser light source. In this way, in the well-known structure, when the number of the laser light sources is increased, a phenomenon of inadequate control signals is occurred.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projector, a light source controller, and a light source control method for expanding light sources.

Other objects and advantages of the invention can be further illustrated by the technical features broadly embodied and described as follows.

In order to achieve one or a portion of or all of the objects or other objects, an embodiment of the invention provides a projector including a first light source, a wavelength conversion device, and a first light source controller. The first light source is adapted to provide a first light beam. The wavelength conversion device is adapted to convert a wavelength of the first light beam into a plurality of converted wavelengths. The first light source controller is coupled to the first light source, and is adapted to drive the first light source. The first light source controller includes a first controller and a first selector. The first controller is adapted to receive a synchronization signal, and adapted to generate a first enable signal and a plurality of first indication signals corresponding to the first enable signal according to the synchronization signal. The synchronization signal has a working period, the first enable signal has a plurality of first pulses, and there is a first interval time between adjacent two first pulses. The first selector is coupled to the first controller. The first selector is adapted to receive a plurality of first control voltages, the first enable signal, and the first indication signals. The first selector is adapted to select one of the first control voltages according to the first enable signal and the first indication signals to generate a first light source control signal. The first light source control signal is adapted to control a light-emitting intensity of the first light beam.

In order to achieve one or a portion of or all of the objects or other objects, an embodiment of the invention provides a light source controller including a controller and a selector. The controller is adapted to receive a synchronization signal, and adapted to generate an enable signal and a plurality of indication signals corresponding to the enable signal according to the synchronization signal. The synchronization signal has a working period, the enable signal has a plurality of pulses, and there is an interval time between adjacent two pulses. The selector is coupled to the controller. The selector is adapted to receive a plurality of control voltages, the enable signal, and the indication signals. The selector is adapted to select one of the control voltages according to the enable signal and the indication signals to generate a light source control signal. The light source control signal is adapted to control a light-emitting intensity of a light source.

In order to achieve one or a portion of or all of the objects or other objects, an embodiment of the invention provides a light source control method adapted to a projector. The light source control method includes following steps. A first controller is provided to receive a synchronization signal, and the synchronization signal has a working period. A first enable signal and a plurality of first indication signals corresponding to the first enable signal are generated by the first controller according to the synchronization signal, and the first enable signal has a plurality of first pulses, and there is a first interval time between adjacent two first pulses. A first selector is provided to receive a plurality of first control voltages, the first enable signal, and the first indication signals, one of the first control voltages is selected according to the first enable signal and the first indication signals to generate a first light source control signal, and the first light source control signal is adapted to control an intensity of a first light beam.

According to the above description, the embodiments of the invention have at least one of following advantages or effects. The projector of the invention is adapted with the light source controller to receive the synchronization signal, and generate the enable signal and the indication signals corresponding to the enable signal according to the synchronization signal. In the embodiments of the invention, the light source controller may control the expanded light sources according to the enable signal and the indication signals. In the embodiment, the light source controller may independently control the expanded light sources to improve quality of the display image of the projector.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
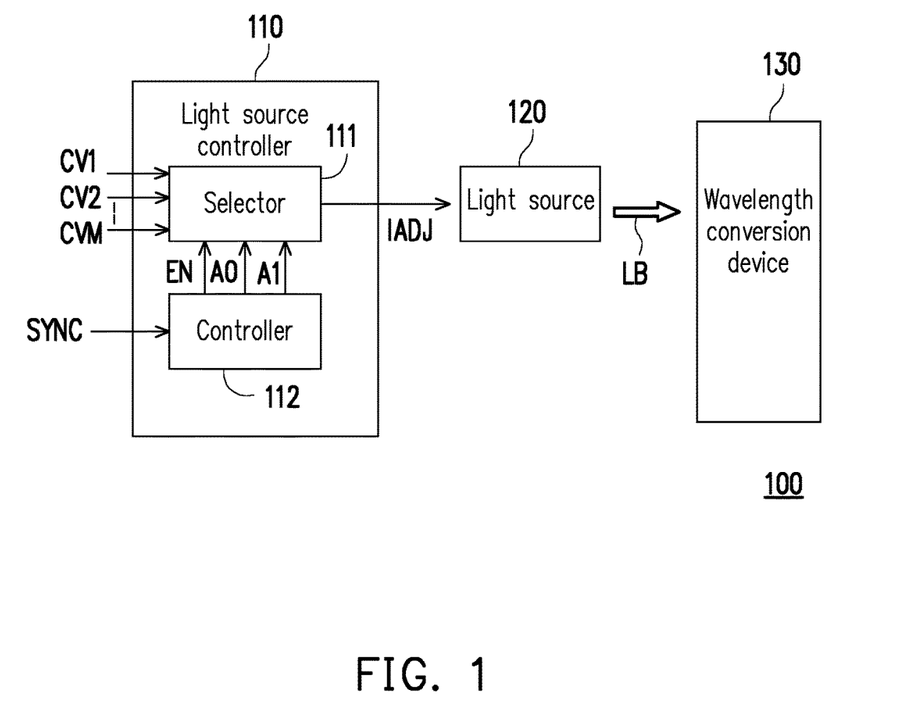
FIG. 1 is a schematic diagram of a projector according to an embodiment of the invention.

Referring to FIG. 1, FIG. 1 is a schematic diagram of a projector according to an embodiment of the invention. The projector 100 includes a light source controller 110, a light source 120, and a wavelength conversion device 130. The light source controller 110 includes a selector 111 and a controller 112, and the selector 111 is coupled to the controller 112. The light source 120 is adapted to provide a light beam LB. In the embodiment, the wavelength conversion device 130 receives the light beam LB provided by the light source 120, and converts a wavelength of the light beam LB into a plurality of converted wavelengths. It should be noted that in the embodiment, the wavelength conversion device 130 may periodically perform the wavelength conversion operation. In the embodiment, the light beam LB provided by the light source 120 may have a single wavelength or a plurality of different wavelengths. In the embodiment, the light source 120 may be a light source emitting a red light beam, though the invention is not limited thereto, and in other embodiments, the light source 120 may be a light source emitting a blue light beam or a green light beam, which is not limited by the invention.

The light source controller 110 is coupled to the light source 120. The light source controller 110 generates a light source control signal IADJ for driving the light source 120. The controller 112 receives a synchronization signal SYNC, and generates an enable signal EN and a plurality of indication signals A0 and A1 corresponding to the enable signal EN according to the synchronization signal SYNC. The synchronization signal SYNC has a working period. In the embodiment, the working period corresponding to a period that the wavelength conversion device 130 executes the wavelength conversion operation. In detail, in the embodiment, the working period of the synchronization signal SYNC is substantially the same to the period that the wavelength conversion device 130 executes the wavelength conversion operation, though the invention is not limited thereto.

In the embodiment, the enable signal EN generated by the controller 112 has a plurality of pulses, and the pulses respectively correspond to times of the plurality of converted wavelengths generated by the wavelength conversion device 130. In the embodiment, there is an interval time between any adjacent two pulses on the enable signal EN. In detail, when the enable signal EN generates a pulse, the light source controller 110 enables the light source control signal IADJ to drive the light source 120 to produce a light beam. Comparatively, during the interval time (i.e. a time between the adjacent two pulses) of the enable signal EN, the light source controller 110 disables the light source control signal IADJ, such that the light source 120 stops providing the light beam. Conventionally, during the process that the wavelength conversion device performs the wavelength conversion operation, when the wavelength is changed, an unstable converted wavelength is probably produced to cause unexpected wavelength of the light beam. However, according to the above description, it is known that the aforementioned problem of unstable/unexpected wavelength may be resolved by setting the interval time in the enable signal EN. In this way, the wavelength conversion device 130 does not provide light beams of the unexpected converted wavelengths, which avails effectively improving working efficiency of the projector.

In the embodiment, the selector 111 receives the enable signal EN and the indication signals A0 and A1 generated by the controller 112, and receives a plurality of control voltages CV1-CVM. The selector 111 selects one of the control voltages CV1-CVM according to the enable signal EN and the indication signals A0 and A1 to produce the light source control signal IADJ.

In detail, in the embodiment, the selector 111 determines one of the control voltages CV1-CVM to be a selected control voltage according to the indication signals A0 and A1, and then determines to output the selected control voltage to serve as a time length voltage level of the light source control signal IADJ according to a width of the corresponding pulse on the enable signal EN.

In the embodiment, the light source 120 is, for example, implemented by a laser diode, though the invention is not limited thereto. In other embodiments, the light source 120 may also be implemented by a light-emitting diode (LED), a lamp bulb or other light-emitting elements.

In the embodiment, the wavelength conversion device 130 is, for example, implemented by a phosphor wheel, though the invention is not limited thereto. In other embodiments, the wavelength conversion device 130 may also be implemented by a color wheel, a filter wheel or other optical devices.

Figure 2:
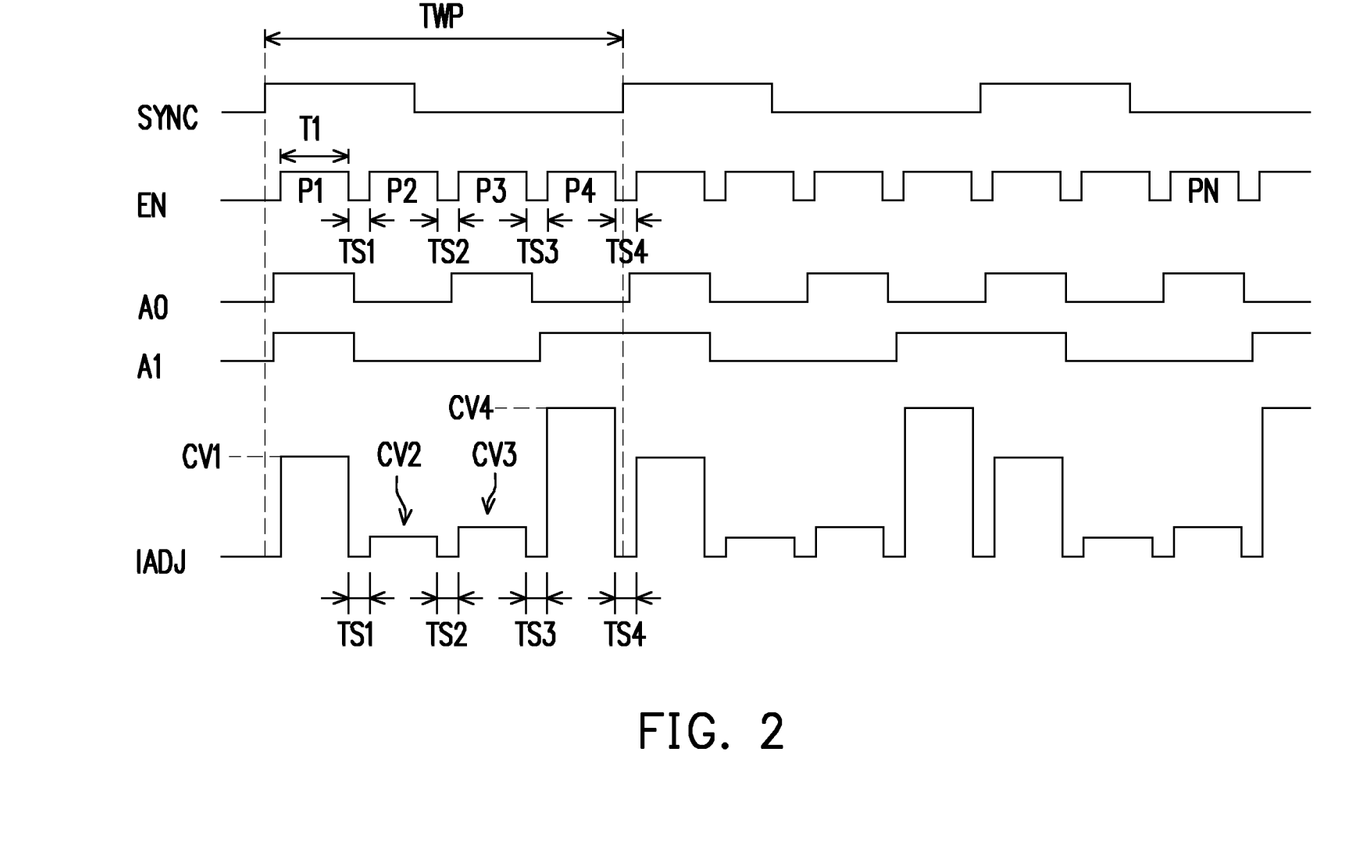
FIG. 2 is a schematic diagram of a working waveform of a projector according to an embodiment of the invention.

Referring to FIG. 1 and FIG. 2 for implementation detail of the light source controller 110, and FIG. 2 is a schematic diagram of a working waveform of the projector according to an embodiment of the invention. In FIG. 2, the synchronization signal SYNC has a working period TWP. The controller 112 generates the enable signal EN according to the synchronization signal SYNC. In the embodiment, the controller 112 generates pulses P1-PN on the enable signal EN according to time intervals on the wavelength conversion device 130 corresponding to each of the converted wavelengths, and inserts an interval time between adjacent two pulses (for example, inserts an interval time TS1 between pulses P1 and P2). Moreover, in the embodiment, the controller 112 generates the indication signals A0 and A1 corresponding to each of the pulses P1-PN according to the pulses P1-PN corresponding to each of the converted wavelengths.

In the embodiment, taking the pulse P1 as an example, the controller 112, for example, generates the corresponding indication signals A0 and A1 according to the pulse P1 corresponding to the converted wavelength of a yellow light. In the embodiment, voltage levels of the indication signals A0 and A1 corresponding to the pulse P1 may all be logic high levels, though the invention is not limited thereto. In the embodiment, the indication signals A0 and A1 may be set as different logic voltage combinations according to each of the pulses P1-PN corresponding to each of the converted wavelengths, for example, the corresponding relationship of the indication signals A0 and A1 and the converted wavelengths is shown as a table 1:

TABLE 1

| A0 | A1 | Corresponding converted wavelength |
|----|----|-----------------------------------|
| 1  | 1  | Yellow light wavelength |
| 1  | 0  | Green light wavelength |
| 0  | 1  | Red light wavelength |
| 0  | 0  | Blue light wavelength |

However, the corresponding relationship of the indication signals A0 and A1 and the converted wavelengths shown in the table 1 is only an example, which is not used for limiting the scope of the invention. A designer may set the corresponding relationship of the indication signals A0 and A1 and the converted wavelengths through different methods. Moreover, the number of the aforementioned indication signals is two (i.e. A0 and A1), which is only an example, and the number of the indication signals is not particularly specified, and according to the above description, it is known that the number of the indication signals may be suitably adjusted according to different number of the converted wavelengths.

Further, regarding an operation detail of the selector 111 of the light source controller 110, the pulse P1 of the enable signal EN is taken as an example, in the embodiment, the selector 111 selects the control voltage CV1 in the control voltages CV1-CVM to serve as a selected control voltage according to the indication signals A0 and A1 corresponding to the pulse P1, and generates the light source control signal IADJ according to a time interval T1 of the pulse P1. To be specific, in the embodiment, a voltage level of the light source control signal IADJ in the time interval T1 is, for example, equal to a voltage level of the control voltage CV1, though the invention is not limited thereto.

Deduced by analogy, in the embodiment, in the time intervals corresponding to the pulses P1-P4, the light source control signal IADJ generated by the light source controller 110 respectively has the voltage levels CV1-CV4. However, the time intervals of the pulses P1-PN may be all different, completely the same, or partially the same and partially different, which is not limited by the invention.

In the embodiment, since there is the interval time (for example, interval time TS1-TS4) between any adjacent two pulses of the enable signal EN, the selector 111 may disable the light source control signal IADJ at the interval time TS1-TS4 in response to the interval time TS1-TS4. In the embodiment, the light source control signal IADJ may have a zero voltage level at the interval time TS1-TS4. However, the interval time TS1-TS4 may be all different, completely the same, or partially the same, which is not limited by the invention.

In the embodiment, a magnitude of a voltage value of the light source control signal IADJ may represent a magnitude of a driving current used for driving the light source 120. Namely, in the embodiment, when the voltage value of the light source control signal IADJ is increased, the driving current provided to the light source 120 is corresponding increased, and a light-emitting intensity (illumination or brightness) of the light beam provided by the light source 120 is also increased. Comparatively, in the embodiment, when the voltage value of the light source control signal IADJ is decreased, the driving current provided to the light source 120 is corresponding decreased, and the light-emitting intensity (illumination or brightness) of the light beam provided by the light source 120 is also decreased.

Figure 3:
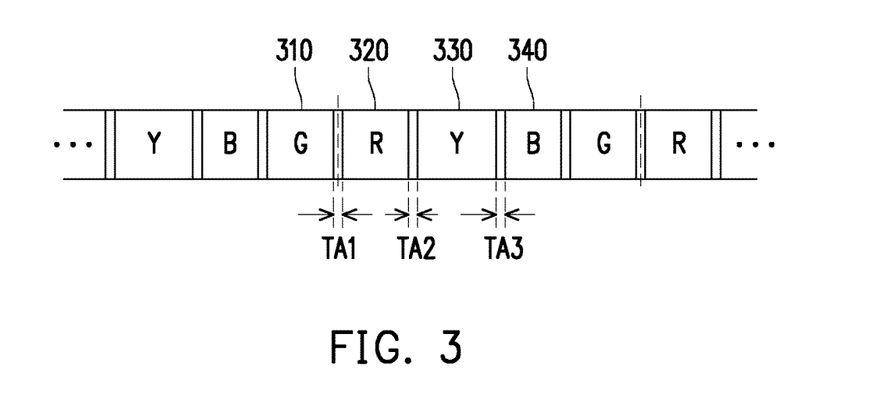
FIG. 3 is a schematic diagram of determination method of interval time according to an embodiment of the invention.

Referring to FIG. 3, FIG. 3 is a schematic diagram of determination method of the interval time according to an embodiment of the invention. In the embodiment, the wavelength conversion device periodically executes the wavelength conversion operation, and sequentially generates a yellow (Y) converted wavelength, a blue (B) converted wavelength, a green (G) converted wavelength and a red (R) converted wave length. In the embodiment, there is a stableness pending time between two adjacent wavelength conversion operations, for example, wavelength conversion operations 310 and 320 have a stableness pending time TA1 there between; wavelength conversion operations 330 and 340 have a stableness pending time TA2 there between; and wavelength conversion operations 330 and 340 have a stableness pending time TA3 there between. In the embodiment, the stableness pending time TA1-TA3 may serve as references for setting the interval time.

The stableness pending time TA1-TA3 may be obtained by actually measuring the wavelength conversion device. In the embodiment, to make the obtained converted wavelengths to be more stable, the interval time may be set to be greater than the stableness pending time TA1-TA3, though the invention is not limited thereto. In other embodiments, the interval time is, for example, equal to the stableness pending time TA1-TA3, though the invention is not limited thereto.

Figure 4:
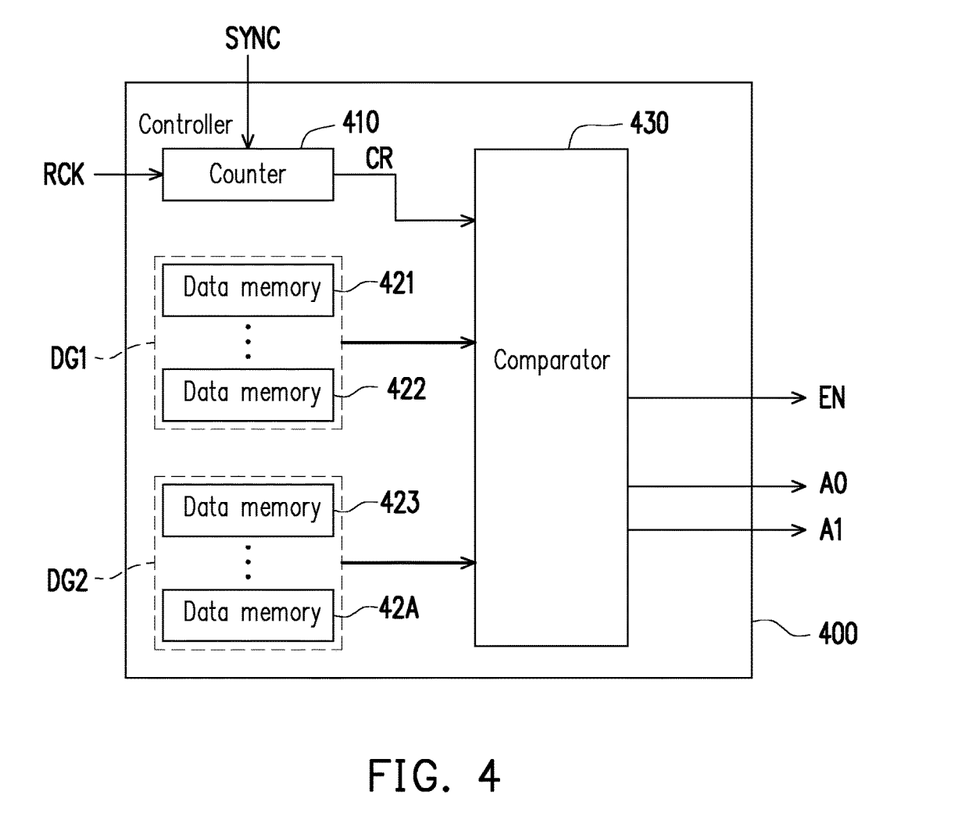
FIG. 4 is a schematic diagram of an implementation of a controller according to an embodiment of the invention.

Referring to FIG. 4, FIG. 4 is a schematic diagram of an implementation of a controller according to an embodiment of the invention. In the embodiment, the controller 400 includes a counter 410, a plurality of data memories 421-42A, and a comparator 430. In the embodiment, the counter 410 receives a reference clock signal RCK to perform a counting operation. In the embodiment, the counting operation may be performed according to the working period of the synchronization signal SYNC. Namely, in the embodiment, when the working period of the synchronization signal SYNC starts, the counter 410 may start the counting operation, and when the working period of the synchronization signal SYNC is ended, the counter 410 may stop the counting operation and reset a counting result CR thereof.

In the embodiment, the data memories 421-42A are used for storing time lengths of each of the pulses in the enable signal EN to be generated and the interval time between adjacent two pulses. In the embodiment, the data memories 421-42A may be divided into two groups, for example, data memory groups DG1 and DG2, though the invention is not limited thereto. In the embodiment, the data memory group DG1 includes the data memories 421-422, and the data memory group DG2 includes the data memories 422-42A. In the embodiment, values stored in the data memories 421-422 represent time lengths of a plurality of pulses in the enable signal EN, and values stored in the data memories 423-42A represent lengths of a plurality of interval time in the enable signal EN, though the invention is not limited thereto.

In the embodiment, the comparator 430 is coupled to the counter 410 and the data memories 421-42A, and sequentially compares the counting result CR of the counter 410 with a plurality of values respectively stored in the data memories 421-42A to generate the enable signal EN.

In the embodiment, an operation detail of the comparator 430 is described below. First, the comparator 430 sets the enable signal EN to a logic high level, and compares the counting result CR generated by the counter 410 with a value stored in the data memory 421, and when the counting result CR generated by the counter 410 is the same to the value stored in the data memory 421, the comparator 430 pulls down the enable signal EN to a logic low level, and generates a pulse. Then, the counter 410 resets the counting result CR thereof, and re-executes the counting operation. Thereafter, the comparator 430 compares the counting result CR with the value stored in the data memory 423, and keeps the enable signal EN to the logic low level to generate an interval time. Thereafter, when the counting result CR is the same to the value stored in the data memory 423, the comparator 430 pulls up the enable signal EN to generate a next pulse.

In the embodiment, the values stored in the data memories 421-42A may be stored in advance, and feasibility of dynamic modification is provided. In the embodiment, the controller 400 may provide a communication interface to transmit values for storing in the data memories 421-42A.

In other embodiments, the data memories 421-42A may be set as a single data memory which stores a plurality of values, i.e. the number of the data memories is not particularly specified. In other embodiments, the data memories 421-42A may be constructed by registers of a digital circuit, or constructed by any type of storage devices well-known by those skilled in the art, which is not limited by the invention.

On the other hand, in the embodiment, during a period that the comparator 430 generates the enable signal EN, the comparator 430 may also generate the indication signals A0 and A1 according to the converted wavelengths corresponding to each of the pulses of the enable signal EN to be generated. In the embodiment, the comparator 430 may correspondingly generate the indication signals A0 and A1 according to a sequence that the wavelength conversion device generates each of the converted wavelengths.

Figure 5A:
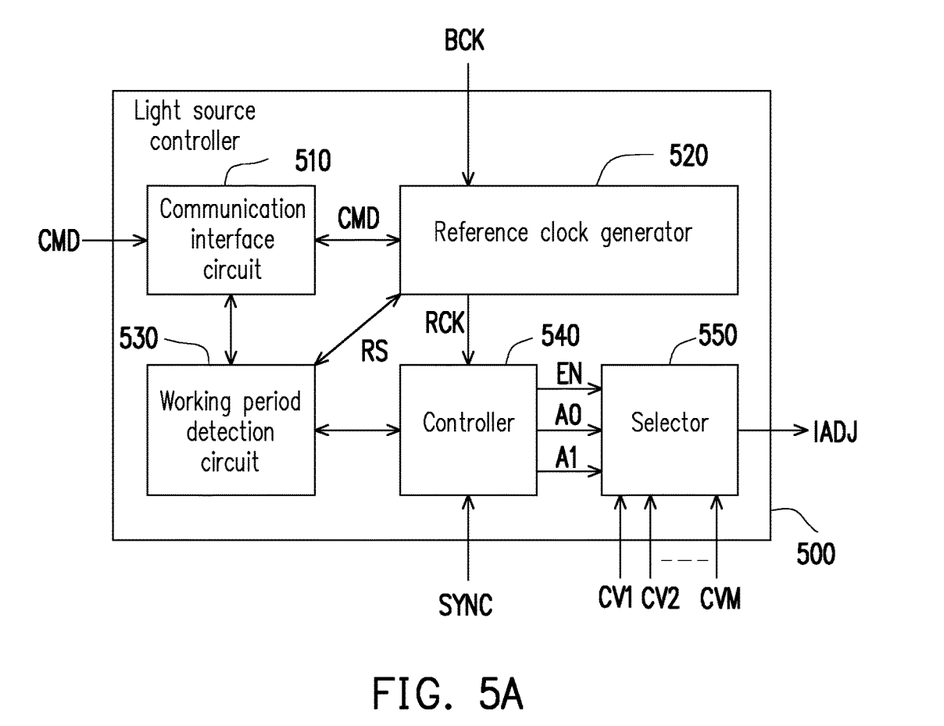
FIG. 5A is a schematic diagram of an implementation of a light source controller according to an embodiment of the invention.

Referring to FIG. 5A, FIG. 5A is a schematic diagram of another implementation of a light source controller according to an embodiment of the invention. In the embodiment, the light source controller 500 includes a communication interface circuit 510, a reference clock generator 520, a working period detection circuit 530, a controller 540, and a selector 550. In the embodiment, the light source controller 500 receives a parameter value CMD through the communication interface circuit 510. In the embodiment, the working period detection circuit 530 is coupled to the communication interface circuit 510. In the embodiment, the working period detection circuit 530 is coupled to the wavelength conversion device, and the working period detection circuit 530 detects a conversion operation (for example, a conversion speed, though the invention is not limited thereto) of the wavelength conversion device to generate the working period, and provides a rotation speed signal RS corresponding to the working period. In the embodiment, the reference clock generator 520 is coupled to the working period detection circuit 530 and the communication interface circuit 510, and generates a reference clock signal RCK according to the parameter value CMD and the working period.

In the embodiment, the communication interface circuit 510 may be a communication interface circuit of a serial interface, for example, an inter-integrated circuit ($I^2C$) interface, a serial peripheral interface (SPI) or other communication interface known by those skilled in the art. In the embodiment, the communication interface circuit 510 receives the parameter value CMD, and provides the parameter value CMD to serve as a parameter for setting the reference clock generator 520.

In the projector, a working frequency of the conversion operation of the wavelength conversion device includes multiple implementations, for example, 50 Hz, 60 Hz, 100 Hz, 120 Hz, 150 Hz and 180 Hz. Under different working frequencies of the wavelength conversion device, the reference clock signal RCK received by the controller 540 is correspondingly set to have different frequencies. In the embodiment, the reference clock generator 520 may be used for determining the frequency of the reference clock signal RCK. In the embodiment, the reference clock generator 520 receives the parameter value CMD and a baseband signal BCK. In the embodiment, the reference clock generator 520 may generate one or a plurality of reference signals according to the baseband signal BCK, and perform frequency-dividing operations to the reference signals to generate a plurality of candidate clock signals. In the embodiment, the reference clock generator 520 may select one of the plurality of candidate clock signals according to the parameter value CMD to obtain the reference clock signal RCK, and the parameter value CMD corresponds to the working frequency of the conversion operation of the wavelength conversion device. Moreover, in the embodiment, the reference clock generator 520 may perform a phase lock operation to the reference clock signal RCK and the rotation speed signal RS, so to ensure synchronous operation between the reference clock signal RCK and the rotation speed signal RS.

For example, the baseband signal BCK is set to 27 MHz and the working period of the wavelength conversion device is set to 50 Hz, when the reference clock signal RCK is set to divide the working frequency of the wavelength conversion device into 3600 equal parts, the frequency of the reference clock signal RCK is 180 KHz, which is about the frequency of the baseband signal BCK divided by 150.

In the embodiment, the baseband signal BCK is, for example, provided by a crystal oscillator, though the invention is not limited thereto. In a part of the embodiments, the baseband signal BCK may also be provided by a RCdelay oscillator or other suitable resonators, which is not limited by the invention. Moreover, in other embodiments that are not illustrated, the electronic device used for providing the baseband signal BCK and the reference clock generator 520 in FIG. 5A may also be implemented by one oscillator, though the invention is not limited thereto.

On the other hand, operation details of the controller 540 and the selector 550 of the embodiment are similar to that of the controller 112 and the selector 111 of the aforementioned embodiment, and details thereof are not repeated.

Figure 5B:
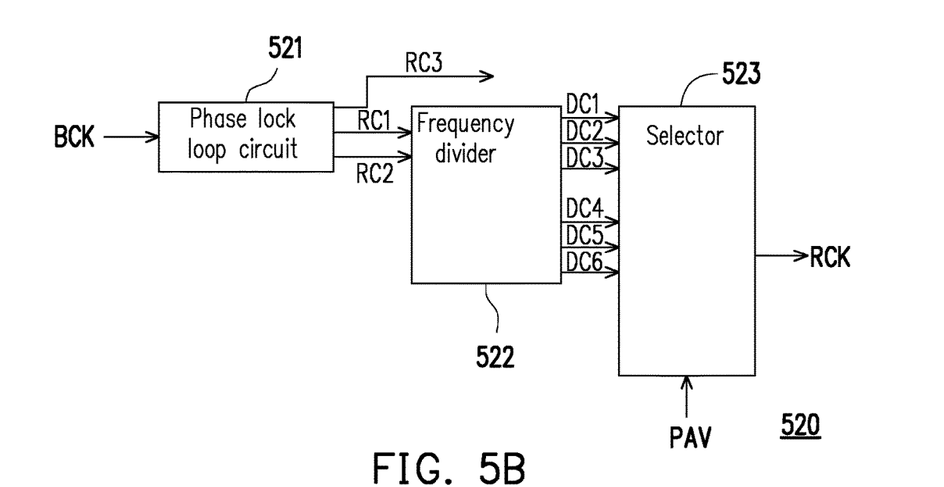
FIG. 5B is a schematic diagram of an implementation of a reference clock generator according to an embodiment of the invention.

An implementation detail of the reference clock generator 520 may refer to FIG. 5B, and FIG. 5B is a schematic diagram of an implementation of the reference clock generator according to an embodiment of the invention. In the embodiment, the reference clock generator 520 includes a phase lock loop (PLL) circuit 521, a frequency divider 522, and a selector 523. In the embodiment, the PLL circuit 521 generates a plurality of reference signals RC1-RC3 according to the baseband signal BCK, and the reference signals RC1-RC3 are clock signals with different frequencies. In the embodiment, the reference signals RC1-RC2 are transmitted to the frequency divider 522, and the reference signal RC3 may serve as an operation clock signal of the communication interface circuit 510.

In the embodiment, the frequency divider 522 may perform frequency-dividing operations to the reference signals RC1-RC2 to generate a plurality of candidate clock signals DC1-DC6 with different frequencies. In the embodiment, the candidate clock signals DC1-DC6 may respectively correspond to different working frequencies of the conversion operation of the wavelength conversion device.

In the embodiment, the selector 523 receives the candidate clock signals DC1-DC6, and selects one of the candidate clock signals DC1-DC6 according to a parameter value PAV to generate the reference clock signal RCK.

The hardware structures of the PLL circuit 521, the frequency divider 522 and the selector 523 of the aforementioned embodiment may all be implemented by circuit structures well-known by those skilled the art, and are not particularly specified.

Figure 6:
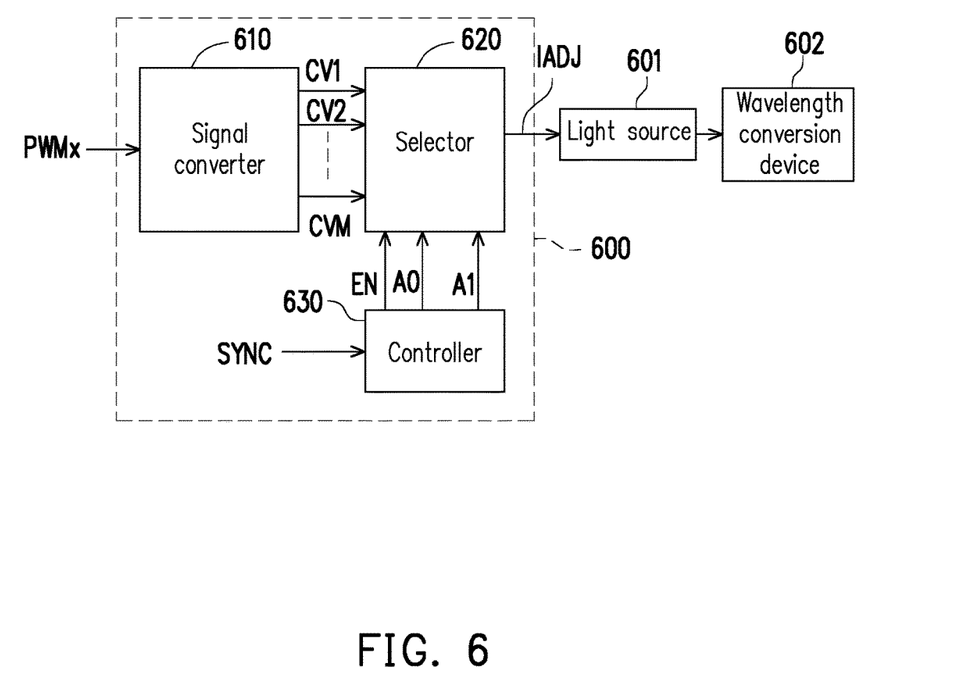
FIG. 6 is a schematic diagram of another implementation of the light source controller according to an embodiment of the invention.

Referring to FIG. 6, FIG. 6 is a schematic diagram of another implementation of the light source controller according to an embodiment of the invention. In the embodiment, the light source controller 600 includes a signal converter 610, a selector 620, and a controller 630. The light source controller 600 provides a light source control signal IADJ to drive a light source 601, and the light source 601 adjusts a light-emitting intensity of the light beam sent to the wavelength conversion device 602.

A main difference between the embodiment of FIG. 6 and the aforementioned embodiment is that the light source controller 600 further includes a signal converter 610. In the embodiment, the signal converter 610 receives a plurality of pulse width modulation signals PWMx, and respectively converts the pulse width modulation signals PWMx into control voltages CV1-CVM according to pulse widths of the pulse width modulation signals PWMx. In the embodiment, the pulse width of each of the pulse width modulation signals PWMx indicates a magnitude of the correspondingly generated driving current. In the embodiment, the larger the pulse width of each of the pulse width modulation signals is, the greater the voltage value of the control voltage generated according to each of the pulse width modulation signals is. Comparatively, the smaller the pulse width of each of the pulse width modulation signals is, the smaller the voltage value of the control voltage generated according to each of the pulse width modulation signals is.

Figure 7A:
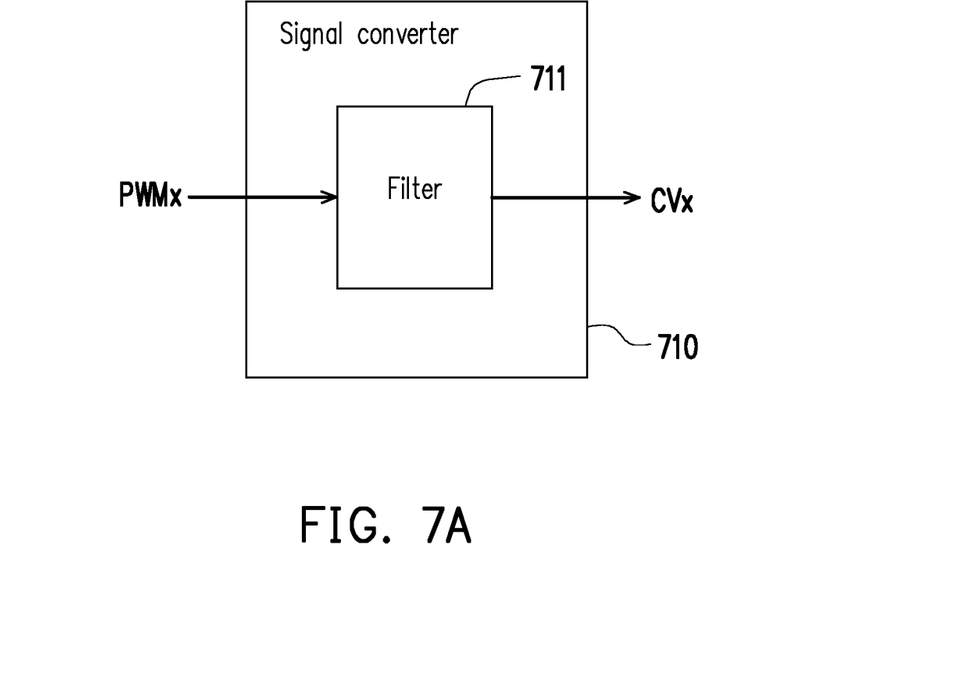
FIG. 7A and FIG. 7B are schematic diagrams of different implementations of a signal converter according to an embodiment of the invention.
Figure 7B:
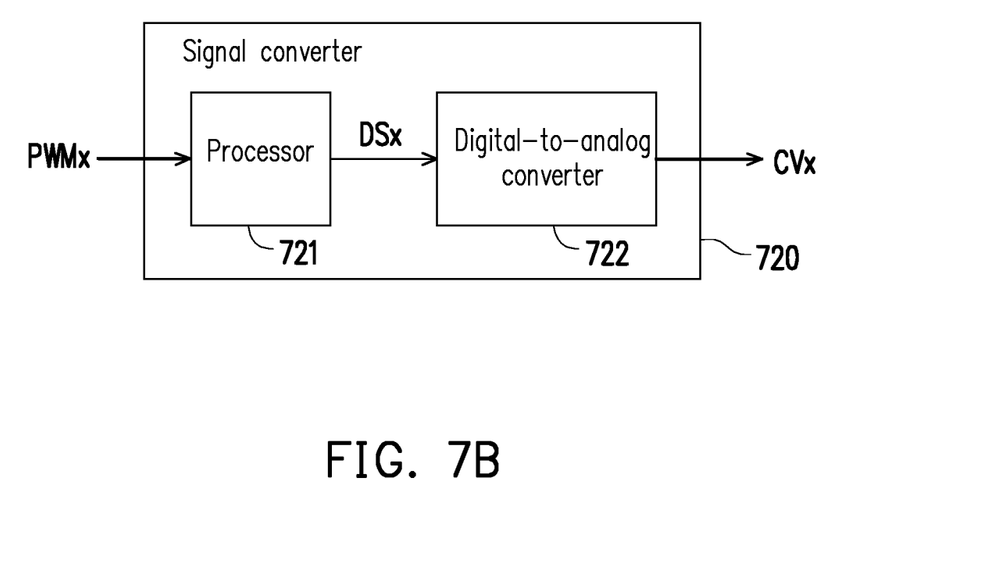

The aforementioned signal converter 610 is described below. Referring to FIG. 7A and FIG. 7B, FIG. 7A and FIG. 7B are schematic diagrams of different implementations of the signal converter according to an embodiment of the invention. Referring to FIG. 7A, in the embodiment, the signal converter 710 includes a filter 711. In the embodiment, the filter 711 receives the pulse width modulation signals PWMx and filters the pulse width modulation signals PWMx to respectively generate control voltages CVx. In the embodiment, the filter 711 may include one or a plurality of low-pass filter circuits, and provide a plurality of filter channels to implement the filter operations of the pulse width modulation signals PWMx. In view of a hardware structure, the filter 711 may be implemented by any filter circuit structure (for example, a resistive filter, a capacitive filter) well-known by those skilled in the art, which is not particularly specified.

Referring to FIG. 7B, in the embodiment, the signal converter 720 includes a processor 721 and a digital-to-analog converter (DAC) 722. In the embodiment, the processor 721 receives the pulse width modulation signals PWMx, and generates digital signals DSx by inspecting the pulse widths of the pulse width modulation signals PWMx. In the embodiment, the DAC 722 is coupled to the processor 721 to receive the digital signals DSx, and performs digital-to-analog conversion operations on the digital signals DSx to respectively generate the control voltages CVx. In an implementation detail of the embodiment, the processor 721 may generate various digital signals DSx with different values according to the pulse widths of each of the pulse width modulation signals PWMx. In the embodiment, the DAC 722 may generate the control voltages CVx with different voltage values according to the values of the digital signals DSx. In the embodiment, the values of the digital signals DSx may be proportional (or inversely proportional) to the voltage values of the control voltages CVx, though the invention is not limited thereto.

It should be noted that in the embodiment, the processor 721 may detect an environmental temperature, and perform a temperature compensation operation during the process of generating the digital signals DSx. To be specific, in the embodiment, under a premise of a fixed light-emitting intensity of the light beam, when the driving current of the light source is required to be correspondingly increased due to a variation of the environmental temperature, the processor 721 may properly increase the values of the generated digital signals DSx. Comparatively, in the embodiment, under the premise of the fixed light-emitting intensity of the light beam, when the driving current of the light source is required to be correspondingly decreased due to the variation of the environmental temperature, the processor 721 may properly decrease the values of the generated digital signals DSx.

In the aforementioned embodiment, the controllers 112, 400, 540, 630 may be designed through a hardware description language (HDL) or any other design method of digital circuit well-known by those skilled in the art, and implemented by manners of field programmable gate array (FPGA), programmable logic device (PLD), complex programmable logic device (CPLD) or application-specific integrated circuit (ASIC), etc., though the invention is not limited thereto.

Moreover, in the aforementioned embodiments, the controllers 112, 400, 540, 630 and the selectors 111 and 550 are, for example, coupled to a data processing chip for receiving the synchronization signal SYNC and the control voltages CV1-CVM from the data processing chip. For example, in the embodiment, the data processing chip coupled to the controller 112 and the selector 111 is, for example, a distributed data processing (DDP) chip, for example, a Texas instruments (TI) distributed data processing chip DDP4422, though the invention is not limited thereto.

Figure 8:
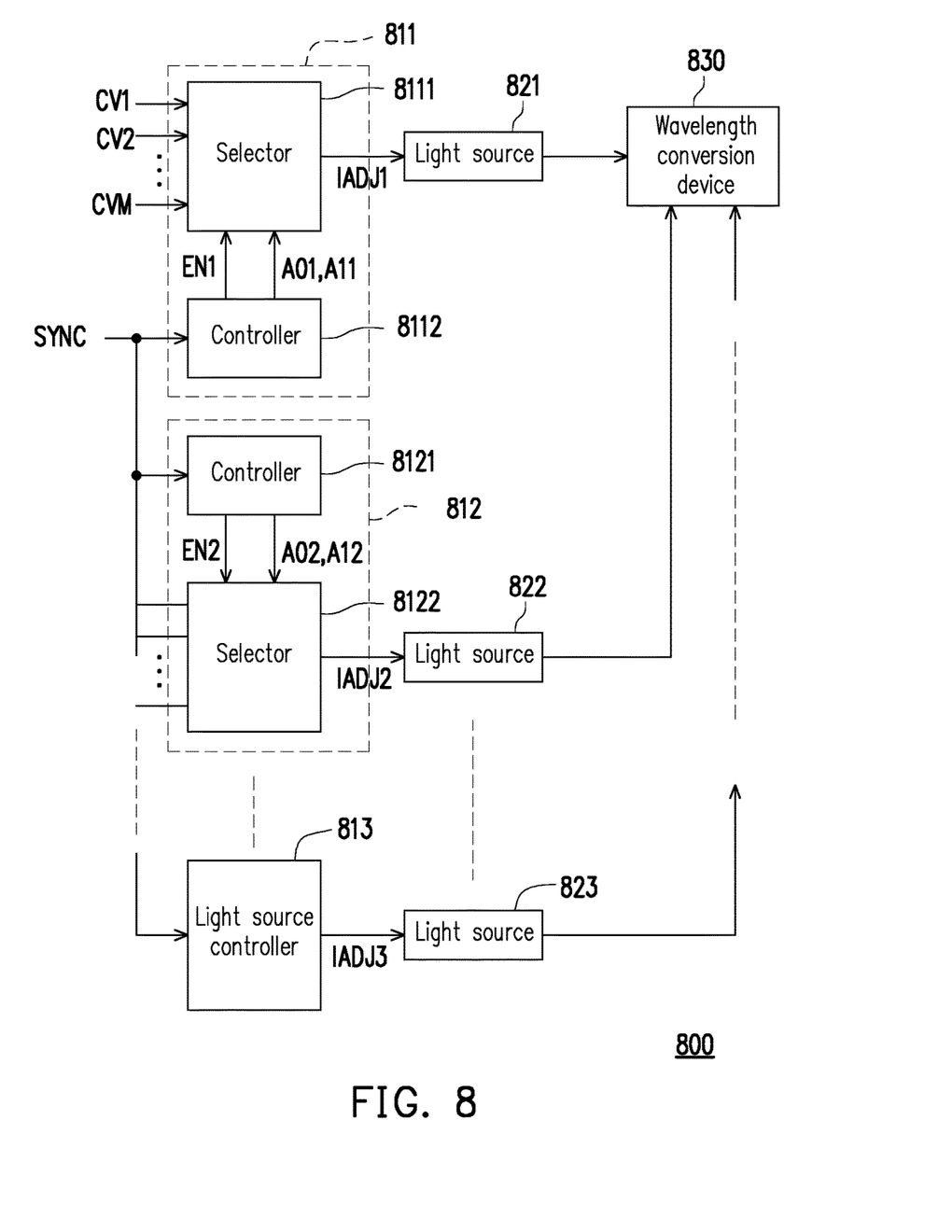
FIG. 8 is a schematic diagram of a projector according to another embodiment of the invention.

According to the above description, it is known that through the design that the controllers 112, 400, 540, 630 and the selectors 111 and 550 are coupled to the data processing chip, the projector may be further configured with one or a plurality of light source controllers to drive a plurality of light sources, i.e. to drive one or a plurality of light sources disposed in the projector in expansion. An embodiment is provided below for further description. Referring to FIG. 8, FIG. 8 is a schematic diagram of a projector according to another embodiment of the invention. In the embodiment, the projector 800 includes a plurality of light source controllers 811, 812, 813, a plurality of light sources 821, 822, 823, and a wavelength conversion device 830. In the embodiment, the light source controller 811 includes a selector 8111 and a controller 8112. In the embodiment, the controller 8112 generates an enable signal EN1 and indication signals A01, A11 according to the synchronization signal SYNC. In the embodiment, the selector 8111 selects one of the control voltages CV1-CVM according to the enable signal EN1 and the indication signals A01, A11 to generate a light source control signal IADJ1 to drive the light source 821.

According to the above description, in the embodiment, the light source controller 812 includes a selector 8121 and a controller 8122. In the embodiment, the controller 8122 generates an enable signal EN2 and indication signals A02, A12 according to the synchronization signal SYNC. In the embodiment, the selector 8121 selects one of the control voltages CV1-CVM according to the enable signal EN2 and the indication signals A02, A12 to generate a light source control signal IADJ2 to drive the light source 822.

According to the above description, in the embodiment, the projector 800 may be further configure with one or a plurality of light source controller 813 in expansion to provide a light source control signal IADJ3 to drive the light source 823. In the embodiment, the light sources 821-823 may respectively emit a plurality of light beams with different wavelengths. In the embodiment, a structure of the light source controller 813 may be the same with that of the light source controllers 811, 812. Under the structure of the embodiment of FIG. 8, the light intensities of the light sources 821-823 may be independently controlled according to the same synchronization signal SYNC, which effectively improves an image display performance of the projector 800.

In the aforementioned embodiment, three light sources (821, 822, 823) and three light source controllers (811, 812, 813) are taken as an example for description, though the number of the light sources and the number of the light source controllers are not limited by the invention. In other embodiments, the projector may have two light sources and two light source controllers, and the two light sources are, for example, a red light source and a blue light source, though the invention is not limited thereto. In some embodiments, the three light sources 821, 822, 823 may be respectively a red light source, a green light source and a blue light source, though the invention is not limited thereto. In some embodiments, the three or more light sources 821-823 may be respectively a first red wavelength light source, a second red wavelength light source, . . . , a blue wavelength light source, though the invention is not limited thereto.

According to the above description, it is known that a plurality of the light source controllers 811-813 receive the same synchronization signal SYNC provided by the data processing chip, so as to drive a plurality of light sources 821-823, i.e. the light sources 821-823 in the projector 800 may be driven by the same synchronization signal SYNC, which resolves the problem of unable to drive one or a plurality of expanded light sources of the conventional technique.

Figure 9:
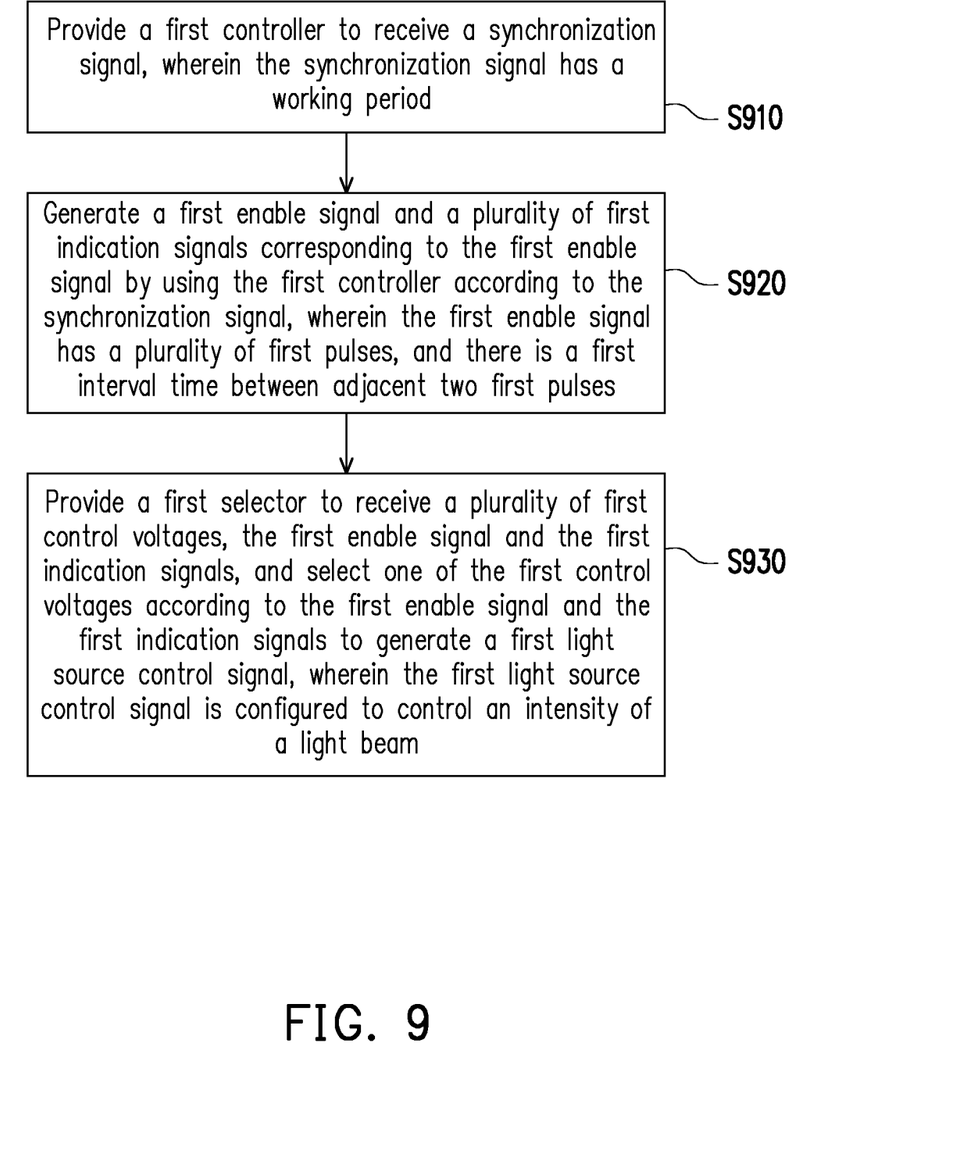
FIG. 9 is a flowchart illustrating a light source control method according to an embodiment of the invention.

Referring to FIG. 9, FIG. 9 is a flowchart illustrating a light source control method according to an embodiment of the invention. In the embodiment, the light source control method is adapted to a projector. In step S910, a controller is provided to receive a synchronization signal, and the synchronization signal has a working period. In step S920, an enable signal and a plurality of indication signals corresponding to the enable signal are generated by the controller according to the synchronization signal, the enable signal has a plurality of pulses, and there is an interval time between two adjacent pulses. In step S930, a selector is provided to receive a plurality of control voltages, the enable signal, and the indication signals; one of the control voltages is selected according to the enable signal and the indication signals to generate a light source control signal; and the light source control signal is adapted to control an intensity of a light beam.

Details of the aforementioned steps have been described in the aforementioned embodiments, which are not repeated.

In summary, the embodiments of the invention have at least one of following advantages or effects. The embodiments of the invention provides the light source controller to receive the synchronization signal, and generate the enable signal and the indication signals corresponding to the enable signal according to the synchronization signal. In this way, in the embodiments of the invention, the light source controller may provide the light source control signal to drive the expanded light source. Moreover, in the embodiments of the invention, when the projector is configured with a plurality of expanded light sources, the driving timing of each of the light sources may be independently controlled, so as to improve the image display performance of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
   a first light source, adapted to provide a first light beam;
   a wavelength conversion device, adapted to convert a wavelength of the first light beam into a plurality of converted wavelengths; and
   a first light source controller, coupled to the first light source, and adapted to drive the first light source, wherein the first light source controller comprising:
      a first controller, adapted to receive a synchronization signal, and adapted to generate a first enable signal and a plurality of first indication signals corresponding to the first enable signal according to the synchronization signal, wherein the synchronization signal has a working period, the first enable signal has a plurality of first pulses, and there is a first interval time between adjacent two first pulses; and
      a first selector, coupled to the first controller, and adapted to receive a plurality of first control voltages, the first enable signal, and the first indication signals, and adapted to select one of the first control voltages according to the first enable signal and the first indication signals to generate a first light source control signal, wherein the first light source control signal is adapted to control a light-emitting intensity of the first light beam.

2. The projector as claimed in claim 1, wherein the first controller is adapted to perform a first counting operation within the working period according to a reference clock signal.

3. The projector as claimed in claim 2, wherein the first light source controller further comprises:
   a communication interface circuit, adapted to receive a parameter value;
   a working period detection circuit, coupled to the communication interface circuit and the wavelength conversion device, and adapted to detect a conversion operation of the wavelength conversion device to generate the working period; and
   a reference clock generator, coupled to the working period detection circuit and the communication interface circuit, and adapted to generate the reference clock signal according to the parameter value and the working period.

4. The projector as claimed in claim 3, wherein the reference clock generator comprises:
   a phase lock loop circuit, adapted to generate at least one reference signal according to a baseband signal;
   a frequency divider, adapted to divide a frequency of the at least one reference signal to generate a plurality of candidate clock signals; and
   an another selector, adapted to select one of the candidate clock signals to serve as the reference clock signal according to the parameter value.

5. The projector as claimed in claim 2, wherein the first controller comprises:
   a counter, adapted to perform the first counting operation within the working period according to the reference clock signal, and adapted to generate a counting result;
   at least one data memory, adapted to store a plurality of first values respectively corresponding to the converted wavelengths and a plurality of second values respectively corresponding to the plurality of first interval time; and
   a comparator, coupled to the counter and the at least one data memory, adapted to compare the counting result with the first values, and adapted to compare the counting result with the second values, so as to generate the first enable signal.

6. The projector as claimed in claim 1, wherein the first pulses of the first enable signal respectively correspond to the converted wavelengths, and the first controller is adapted to generate the first indication signals respectively corresponding to the converted wavelengths.

7. The projector as claimed in claim 1, wherein the first selector is adapted to select the first light source control signal according to the first indication signals, and adapted to enable the first light source control signal at a plurality of time respectively corresponding to the first pulses.

8. The projector as claimed in claim 1, wherein the first selector is adapted to disable the first light source control signal at the plurality of first interval time.

9. The projector as claimed in claim 1, wherein the first light source controller further comprises:
   a signal converter, adapted to receive a plurality of pulse width modulation signals, and adapted to respectively convert the pulse width modulation signals into the first control voltages according to pulse widths of the pulse width modulation signals.

10. The projector as claimed in claim 9, wherein the signal converter comprises:
    at least one filter, adapted to receive the pulse width modulation signals for filtering the pulse width modulation signals, so as to generate the first control voltages.

11. The projector as claimed in claim 9, wherein the signal converter comprises:
    a processor, adapted to receive the pulse width modulation signals, and adapted to generate a plurality of digital signals according to the pulse widths of the pulse width modulation signals; and
    a digital-to-analog converter, coupled to the processor, and adapted to perform a digital-to-analog conversion operation on the digital signals to respectively generate the first control voltages.

12. The projector as claimed in claim 1, wherein the working period is equal to a working time that the wavelength conversion device executes conversion operations of the converted wavelengths.

13. The projector as claimed in claim 1, further comprising:
   at least one second light source, adapted to provide at least one second light beam; and
   at least one second light source controller, coupled to the at least one second light source, and adapted to drive the at least one second light source, wherein the at least one second light source controller comprises:
      a second controller, adapted to receive the synchronization signal, and adapted to execute a second counting operation to generate a second enable signal and a plurality of second indication signals corresponding to the second enable signal, wherein the second enable signal has a plurality of second pulses, and there is a second interval time between adjacent two second pulses; and
      a second selector, coupled to the second controller, and adapted to receive a plurality of second control voltages, the second enable signal, and the second indication signals, and adapted to select one of the second control voltages according to the second enable signal and the second indication signals to generate a second light source control signal, wherein the second light source control signal is adapted to control a light-emitting intensity of the second light beam.

14. The projector as claimed in claim 13, wherein a wavelength of the first light beam is different from a wavelength of the second light beam.

15. A light source controller, comprising:
   a controller, adapted to receive a synchronization signal, and adapted to generate an enable signal and a plurality of indication signals corresponding to the enable signal according to the synchronization signal, wherein the synchronization signal has a working period, the enable signal has a plurality of pulses, and there is an interval time between adjacent two pulses; and
   a selector, coupled to the controller, and adapted to receive a plurality of control voltages, the enable signal, and the indication signals, and adapted to select one of the control voltages according to the enable signal and the indication signals to generate a light source control signal, wherein the light source control signal is adapted to control a light-emitting intensity of a light source.

16. The light source controller as claimed in claim 15, wherein the controller is adapted to perform a counting operation within the working period according to a reference clock signal.

17. The light source controller as claimed in claim 16, further comprising:
   a communication interface circuit, adapted to receive a parameter value;
   a working period detection circuit, coupled to the communication interface circuit and a wavelength conversion device, and adapted to detect a conversion operation of the wavelength conversion device to generate the working period; and
   a reference clock generator, coupled to the working period detection circuit and the communication interface circuit, and adapted to generate the reference clock signal according to the parameter value and the working period.

18. The light source controller as claimed in claim 17, wherein the reference clock generator comprises:
   a phase lock loop circuit, adapted to generate at least one reference signal according to a baseband signal;
   a frequency divider, adapted to divide a frequency of the at least one reference signal to generate a plurality of candidate clock signals; and
   an another selector, adapted to select one of the candidate clock signals to serve as the reference clock signal according to the parameter value.

19. The light source controller as claimed in claim 16, wherein the controller comprises:
   a counter, adapted to perform the counting operation within the working period according to the reference clock signal, and adapted to generate a counting result;
   at least one data memory, adapted to store a plurality of first values respectively corresponding to the pulses and a plurality of second values respectively corresponding to the plurality of interval time; and
   a comparator, coupled to the counter and the at least one data memory, adapted to compare the counting result with the first values, and adapted to compare the counting result with the second values, so as to generate the enable signal.

20. The light source controller as claimed in claim 15, wherein the pulses of the enable signal respectively correspond to a plurality of converted wavelengths, and the controller is adapted to generate the indication signals respectively corresponding to the converted wavelengths.

21. The light source controller as claimed in claim 15, wherein the selector is adapted to select the light source control signal according to the indication signals, and adapted to enable the light source control signal at a plurality of time respectively corresponding to the pulses.

22. The light source controller as claimed in claim 15, wherein the selector is adapted to disable the light source control signal at the plurality of interval time.

23. The light source controller as claimed in claim 15, further comprising:
   a signal converter, adapted to receive a plurality of pulse width modulation signals, and adapted to respectively convert the pulse width modulation signals into the control voltages according to pulse widths of the pulse width modulation signals.

24. The light source controller as claimed in claim 23, wherein the signal converter comprises:
   at least one filter, adapted to receive the pulse width modulation signals for filtering, so as to generate the control voltages.

25. The light source controller as claimed in claim 23, wherein the signal converter comprises:
   a processor, adapted to receive the pulse width modulation signals, and adapted to generate a plurality of digital signals according to the pulse widths of the pulse width modulation signals; and
   a digital-to-analog converter, coupled to the processor, and adapted to perform a digital-to-analog conversion operation on the digital signals to respectively generate the control voltages.

26. A light source control method, adapted to a projector, comprising:
   providing a first controller to receive a synchronization signal, wherein the synchronization signal has a working period;
   generating a first enable signal and a plurality of first indication signals corresponding to the first enable signal by the first controller according to the synchronization signal, wherein the first enable signal has a plurality of first pulses, and there is a first interval time between adjacent two first pulses; and providing a first selector to receive a plurality of first control voltages, the first enable signal, and the first indication signals, and selecting one of the first control voltages according to the first enable signal and the first indication signals to generate a first light source control signal, wherein the first light source control signal is adapted to control an intensity of a first light beam.

27. The light source control method as claimed in claim 26, wherein the step of generating the first enable signal and the first indication signals corresponding to the first enable signal according to the synchronization signal comprises:

performing a first counting operation within the working period according to the reference clock signal by the first controller, and generating a counting result;

storing a plurality of first values respectively corresponding to the first pulses and storing a plurality of second values respectively corresponding to the plurality of first interval time by the first controller; and comparing the counting result with the first values and comparing the counting result with the second values by the first controller, so as to generate the first enable signal.

28. The light source control method as claimed in claim 27, further comprising:

receiving a parameter value by a communication interface circuit;

detecting a conversion operation of the wavelength conversion device to generate the working period by a working period detection circuit; and generating the reference clock signal according to the parameter value and the working period by a reference clock generator.

29. The light source control method as claimed in claim 28, wherein the step of generating the reference clock signal according to the parameter value and the working period by the reference clock generator comprises:

generating at least one reference signal according to a baseband signal by a phase lock loop circuit of the reference clock generator;

dividing a frequency of the at least one reference signal to generate a plurality of candidate clock signals by a frequency divider of the reference clock generator; and selecting one of the candidate clock signals to serve as the reference clock signal according to the parameter value by a selector of the reference clock generator.

30. The light source control method as claimed in claim 26, wherein the step of generating the first enable signal and the first indication signals corresponding to the first enable signal according to the synchronization signal comprises:

respectively generating the first indication signals corresponding to the converted wavelengths by the first controller, wherein the first pulses of the first enable signal respectively correspond to the converted wavelengths.

31. The light source control method as claimed in claim 26, wherein the step of selecting one of the first control voltages according to the first enable signal and the first indication signals to generate the first light source control signal comprises:

selecting the first light source control signal according to the first indication signals by the first selector, and enabling the first light source control signal at a time corresponding to the first pulses.

32. The light source control method as claimed in claim 26, wherein the step of selecting one of the first control voltages according to the first enable signal and the first indication signals to generate the first light source control signal comprises:

disabling the first light source control signal at the plurality of first interval time by the first selector.

33. The light source control method as claimed in claim 26, further comprising:

providing a signal converter to receive a plurality of pulse width modulation signals, and respectively converting the pulse width modulation signals into the first control voltages according to pulse widths of the pulse width modulation signals.

34. The light source control method as claimed in claim 33, wherein the step of respectively converting the pulse width modulation signals into the first control voltages according to the pulse widths of the pulse width modulation signals comprises:

filtering the pulse width modulation signals by the signal converter to generate the first control voltages.

35. The light source control method as claimed in claim 33, wherein the step of respectively converting the pulse width modulation signals into the first control voltages according to the pulse widths of the pulse width modulation signals comprises:

generating a plurality of digital signals according to the pulse widths of the pulse width modulation signals by the signal converter; and performing a digital-to-analog conversion operation on the digital signals to respectively generate the first control voltages by the signal converter.

36. The light source control method as claimed in claim 26, further comprising:

providing at least one second controller, and executing at least one second counting operation to generate at least one second enable signal and a plurality of second indication signals corresponding to the at least one second enable signal, wherein the at least one second enable signal has a plurality of second pulses, and there is a second interval time between adjacent two second pulses; and providing at least one second selector, receiving a plurality of second control voltages, the at least one second enable signal, and the second indication signals, and selecting one of the second control voltages according to the at least one second enable signal and the second indication signals to generate at least one second light source control signal, wherein the at least one second light source control signal is adapted to control an intensity of at least one second light beam.

* * * * *